United States Patent [19]
Verkuylen et al.

[11] Patent Number: 5,431,370
[45] Date of Patent: Jul. 11, 1995

[54] FISH TAPE TUGGER

[76] Inventors: Donald G. Verkuylen, Rte. 1, Box 31, Mapleton, Minn. 56065; Jason E. Tauer, 527 Hickory St., Mankato, Minn. 56073

[21] Appl. No.: 218,745

[22] Filed: Mar. 28, 1994

[51] Int. Cl.⁶ .............................................. B65H 59/00
[52] U.S. Cl. ........................................... 254/134.3 FT
[58] Field of Search ............... 254/134.3 R, 134.3 FT; 81/487; 269/6; 140/123, 123.5

[56] References Cited

U.S. PATENT DOCUMENTS

| | | |
|---|---|---|
| 3,302,929 | 2/1967 | Danielson et al. |
| 3,312,128 | 4/1967 | Wasson .................. 81/487 |
| 4,220,322 | 9/1980 | Hobday .................. 269/6 |
| 4,746,099 | 5/1988 | Lopes . |
| 4,819,911 | 4/1989 | Cielker . |
| 5,022,633 | 1/1991 | Lopes . |

Primary Examiner—Robert C. Watson
Attorney, Agent, or Firm—Moore & Hansen

[57] ABSTRACT

A fish tape pulling tool useable with one or both hands as desired is disclosed. The tool includes a barrel-like body portion having a slot extending through the body portion that is sized to slidingly receive a flexible tape therein. The tool further includes first and second posts that are attached to and extend outwardly in substantially the same direction from the body portion. The second post is pivotally attached to the body portion and engages a pivotally mounted pawl that is moveable between a first position and a second position by the pivotal movement of the second post. In the first position tile pawl is not in a clamping engagement with the flexible tape and in the second position the pawl is in a clamping engagement with the flexible tape. The tool may also include a cross bar extending outwardly from the body portion with an axis perpendicular to that of the posts and providing an extra gripping surface for tile user.

20 Claims, 3 Drawing Sheets

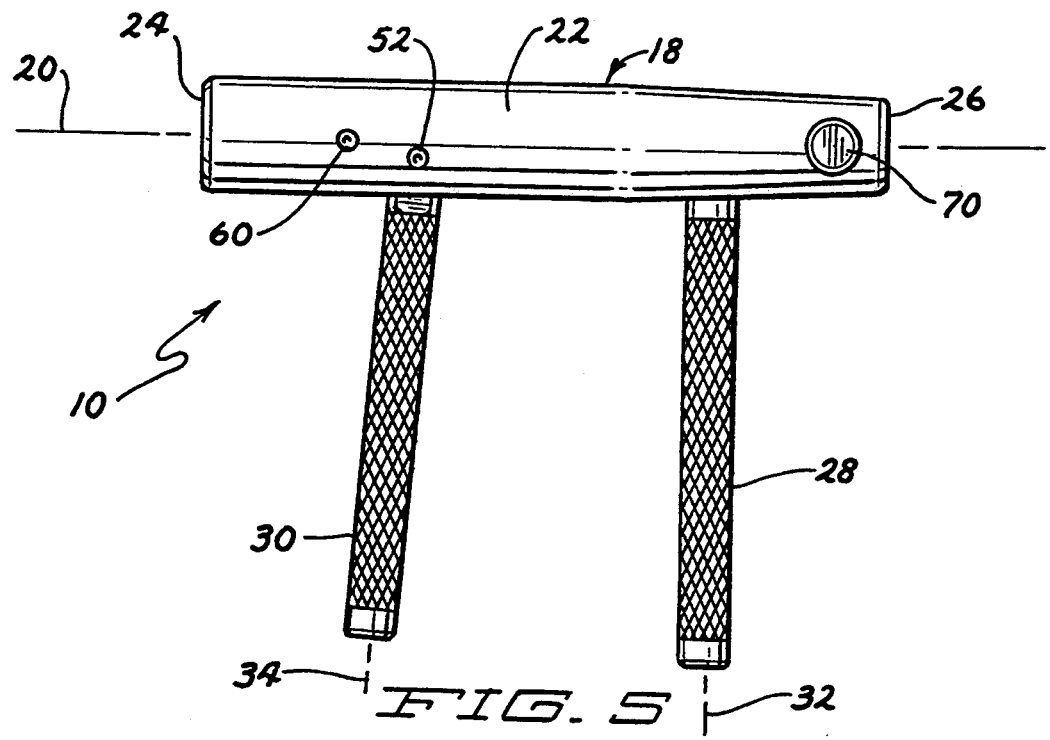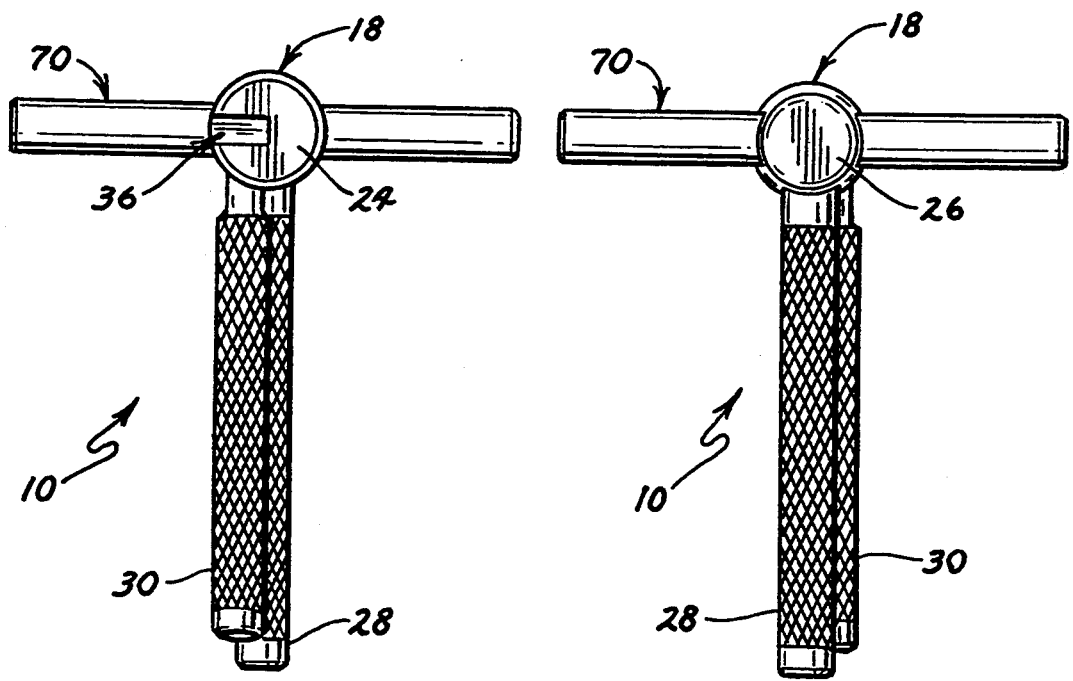

FISH TAPE TUGGER

FIELD OF THE INVENTION

The present invention relates generally to tools used to manipulate steel tapes. In particular, the present invention relates to a fish tape tugger, that is, a tool useful for tugging or pulling steel tapes of the type used by electricians in wiring a structure, otherwise known as fish tapes, through conduits in which the electrical wiring will run.

BACKGROUND OF THE PRESENT INVENTION

When wiring a newly erected structure, such as a residential home or commercial building, conduit for electrical wire will often be attached within the walls. The electrician will then insert the end of a piece of flexible steel tape—the fish tape—into one end of tile conduit and push it through to tile other end. Electrical wire will be attached to tile fish tape and the fish tape will be pulled completely through tile conduit by the electrician, thereby dragging the attached electrical wire along with it through the conduit.

It is often the case that the conduit will have one or more bends in it. While the flexible fish tape can fairly easily navigate these bends, the electrician at times faces a hard task in pulling the typically more stiff wire through the conduit and around these bends. In addition, even where the conduit does not include such bends, the frictional engagement of the electrical wiring with the conduit walls can create a significant drag force on the wiring, resulting in the need for great strength to pull the wiring through the conduit. Consequently, various tools have been developed to facilitate the electrician in pulling fish tape and the attached wiring through conduit.

Examples of such known tools can be found in U.S. Pat. No. 3,302,929 to Danielson et al.; U.S. Pat. No. 4,746,099 to Lopes; U.S. Pat. No. 4,819,911 to Cielker; and U.S. Pat. No. 5,022,633 to Lopes. The Danielson tool relies on a camming mechanism to grip the fish tape initially. The tool user can then pull on a pair of handles that extend outwardly in opposite directions from tile tape gripping mechanism to pull the fish tape through the conduit. Similarly, both Lopes patents rely on a camming action to grip the fish tape securely. The tool user then exerts a pulling force on the tool to pull the fish tape through the wall or conduit. Lopes '099 requires the use of both hands while Lopes '633 claims to be useable with one hand only. The Cielker tool grips the fish tape in a clamping action and includes a pair of handle members pivotable with respect to each other in the manner of a pliers to grip the fish tape. The Cielker tool is said to be capable of use with one hand.

Each of the aforementioned tools requires the use of either both hands or a single hand. None appears to be equally useable with either one or two hands as desired or as needed by the electrician. The Cielker tool, which is useable with one hand, is constructed so as to have gripping surfaces for the electrician's hands that lie nearly parallel to the direction of pull. This configuration makes it easy for the electrician's hands to slide off the tool and makes maintaining a grip on the tool generally difficult during use.

SUMMARY OF THE INVENTION

It is an object of the present invention to provide new and improved apparatus that is not subject to the foregoing disadvantages.

It is another object of the present invention to provide apparatus for pulling on fish tape that is readily useable with one or two hands.

It is still another object of the present invention to provide apparatus for pulling on fish tape that is readily useable with either the left or the right hand.

It is still yet another object of the present invention to provide apparatus that provides perpendicular gripping axes for the user's hands.

The foregoing objects of the present invention are provided by a tool useable with one or both hands as desired. The tool includes a barrel-like body portion having a slot extending from tile forward end of the body portion rearwardly and upwardly towards the top of the body portion. The slot is sized to slidingly receive a flexible tape therein. The tool further includes first and second posts that cooperate together to define a pistol grip hand engagement system. The posts are attached to and extend outwardly in substantially the same direction from the body portion. The second post is pivotally attached to the body portion and engages a pawl that is also pivotally attached to the body portion. The pawl is moveable between a first position and a second position by the pivotal movement of tile second post. In the first position the pawl is not in a clamping engagement with the flexible tape and in the second position the pawl is in a clamping engagement with the flexible tape. Preferably the first and second posts and the body portion each have an elongate axis and the post axes are disposed substantially perpendicular to tile body portion axis.

In one embodiment in accord with the present invention the second post will be pivotable toward the first post so as to actuate the pawl or other tape clamping means to clamp the flexible tape in place such that a pulling force may be exerted thereon. The slot may be defined by substantially linear walls or if desired may take the form of a curvilinear channel. In either case, a line drawn between the entrance of the slot and the exit of the slot from the body portion is preferably disposed at substantially a ten degree angle relative to the elongate axis of the tool body portion.

The foregoing invention and objects thereof will become apparent to those skilled in the art when the following detailed description of the invention is read in conjunction with the accompanying drawings and claims. Throughout the drawings, like numerals refer to similar or identical parts.

BRIEF DESCRIPTION OF THE DRAWINGS

FIG. 4 is a forward elevation view of the present invention shown looking from the forward end to the rearward end thereof.

FIG. 5 is a side elevation view of the present invention showing the reverse side thereof.

FIG. 6 is a rear elevation view of the present invention looking from the rear end to the forward end thereof.

DETAILED DESCRIPTION OF THE INVENTION

Figure 2:
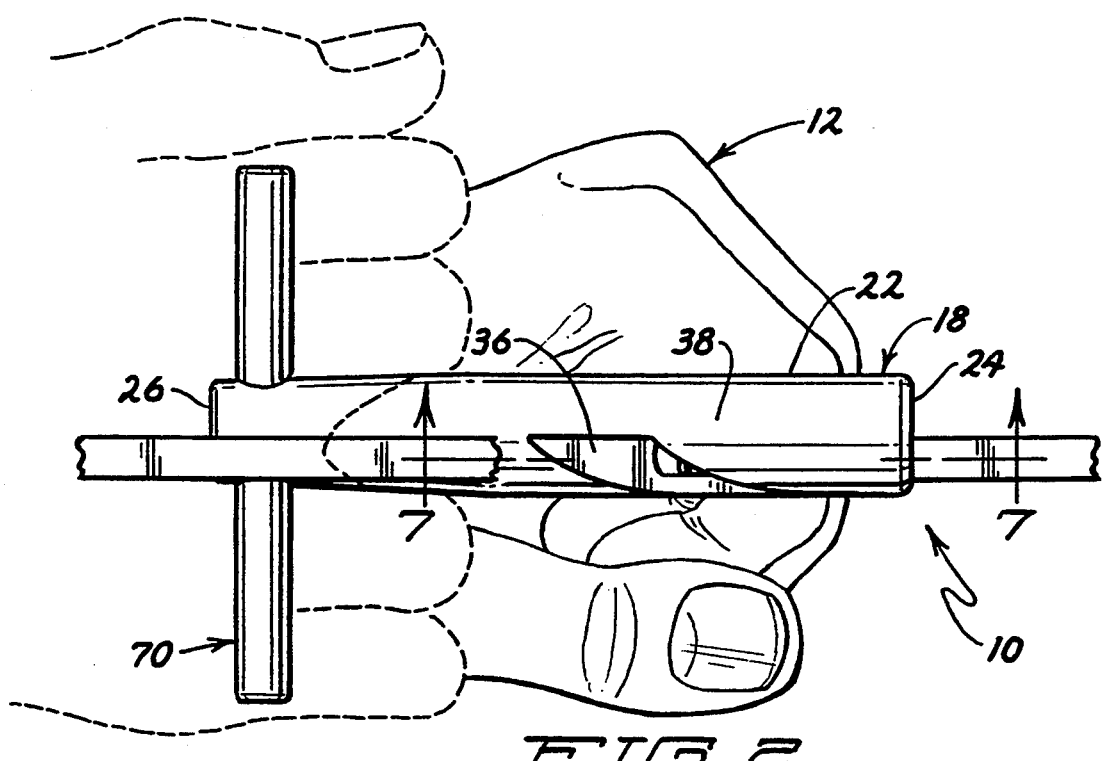
FIG. 2 is a top elevation view of the invention shown in FIG. 1 with the user's second hand shown in phantom outline gripping the cross-piece of the invention and with the flexible tape broken away to illustrate the tape slot exiting the top of the invention.
Figure 1:
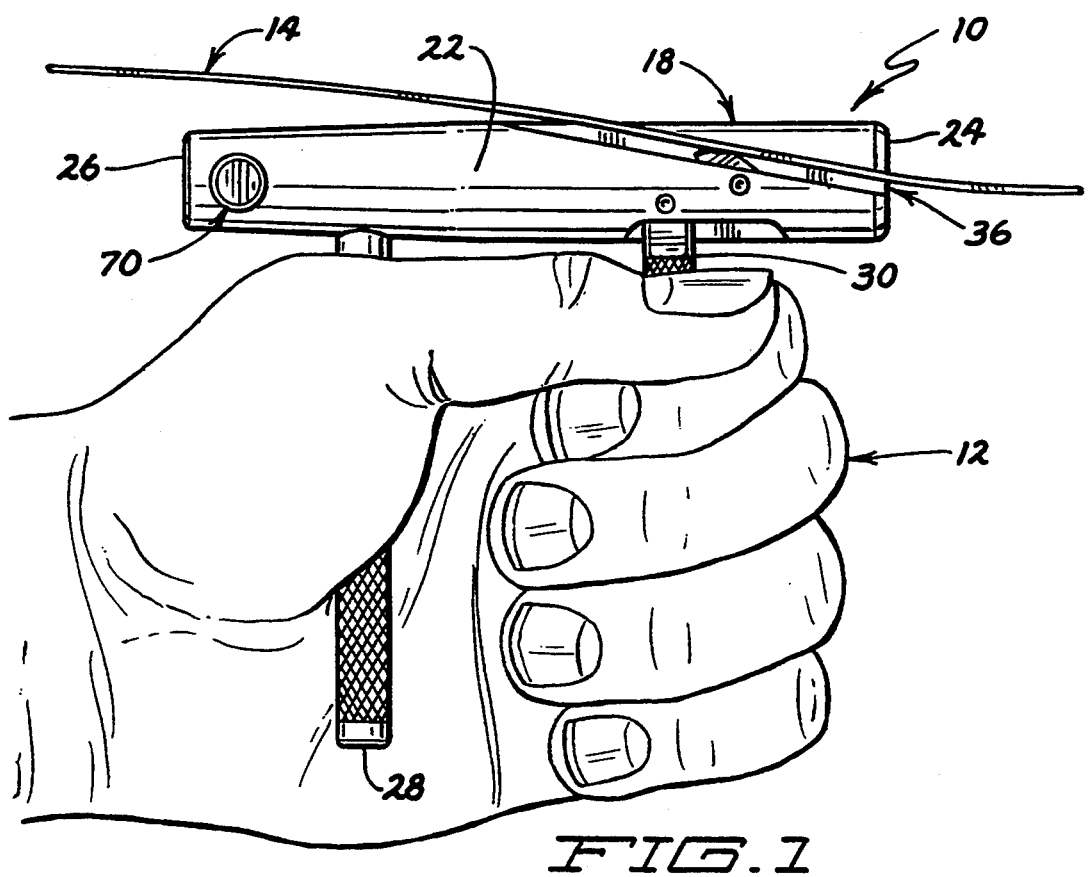
FIG. 1 is a side elevation view of an embodiment of the present invention shown being held in the hand of user thereof.

FIGS. 1 and 2 show an embodiment 10 in accord with the present invention being held in the left hand 12 of a user. The tool 10 is shown grippingly engaging an indeterminate length of flexible tape 14, such as electrician's fish tape. A second hand 16, the tool user's right hand, is shown in phantom outline in FIG. 2. As shown in the Figures, the tool 10 is easily gripped in the manner of a hand gun. As will be discussed further below, one of the meritorious features of the present invention is that it is equally useful in either hand.

Figure 3:
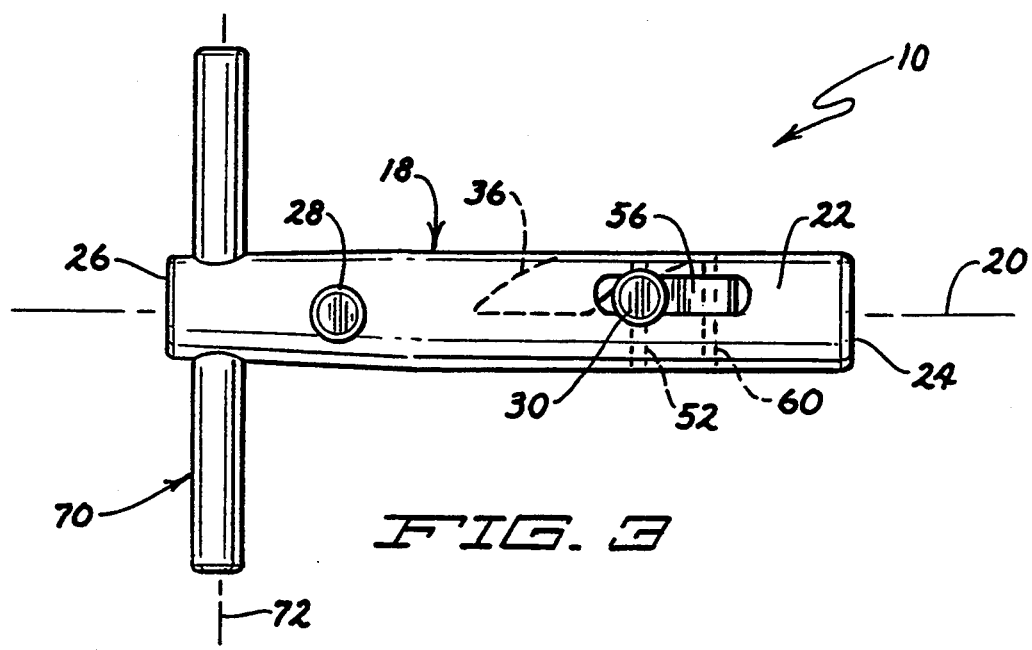
FIG. 3 is a bottom elevation view of the embodiment of the present invention shown in FIGS. 1 and 2.

Referring now to FIGS. 1-6, the present invention will be further described. Tool 10 includes a body portion 18 that as shown has an elongate, substantially tubular or barrel-like configuration and an elongate axis 20 (FIGS. 3, 5). Body portion 18 has a substantially cylindrical outer surface 22, a substantially flat forward surface 24, and a substantially flat rear surface 26. As best seen in FIGS. 1, 3, and 5, body portion 18 need not have a uniform cylindrical outer surface 22. As seen in those Figures, the diameter of the body portion is larger at the forward end of the tool 10 than at the rear end thereof, with the width of the tool 10 starting near the center thereof to narrow from the front of the tool 10 to the rear.

Tool 10 also includes first and second posts 28 and 30. First, or rear, post 28 is rearwardly disposed of second, or forward, post 30. Each post 28, 30, has a substantially elongate, cylindrical configuration defined by a longitudinal axis 32, 34, respectively (FIG. 5). First post axis 32 is substantially perpendicular to body portion axis 20 while second post axis 34 is nearly so. First post 28 is preferably attached to body portion 18 so as to not be readily removable. For example, first post 28 may have a threaded end that is received within a threaded receptacle or socket within body portion 18. Alternatively, first post 28 may have an end that is snugly received within a recess within body portion 18 and that is held therein by friction. Or, if desired, first post 28 may be welded or otherwise permanently affixed to body portion 18.

Figure 7:
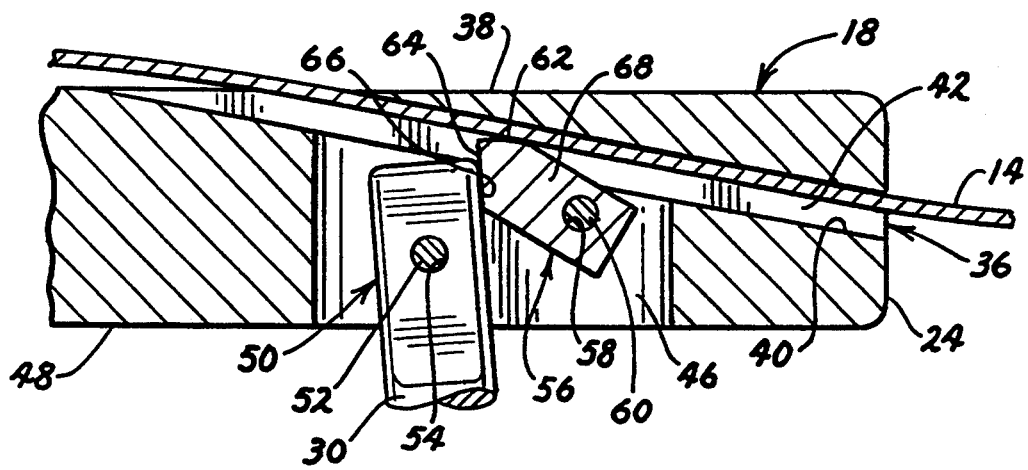
FIG. 7 is a cross-sectional view taken along cutting plane 7—7 of FIG. 2 and shows the pawl engaging the flexible tape.
Figure 8:
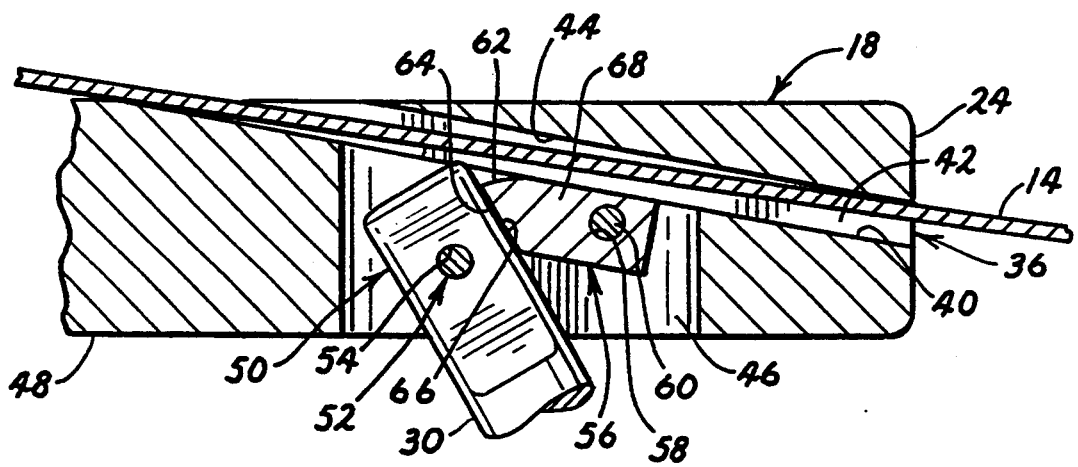
FIG. 8 is cross-sectional view of the present invention taken along the same cutting plane as FIG. 7 and shows the pawl disengaged from the flexible tape.

Body portion 18 includes a slot 36 that extends from the forward surface 24 rearwardly and upwardly therethrough, as best seen in FIGS. 7 and 8, so as to exit through the top 38 of outer surface 22 as best seen in FIG. 2. As shown, slot 36 is defined by three walls formed by body portion 18. Thus, slot 36 includes a bottom wall 40, a side wall 42, and a top wall 44. As seen in the drawings, slot 36 is open to the outer environment on the other side thereof. Slot 36 is therefore an open faced, laterally accessible opening. This open side facilitates placement of the tape 14 within slot 36 when desired since the tape is easily slid into the slot through the open side thereof. If desired, slot 36 could be completely enclosed within body portion 18 and such a configuration is within the scope of the present invention. Slot 36 extends through body portion 18 at approximately a ten degree angle relative to the body portion horizontal axis 20. Such an angle is not critical and may vary between five (5) degrees and fifteen (15) degrees. Additionally, as shown, slot 36 has walls that are substantially planar. If desired, the walls forming slot 36 could have a curved configuration as long as a line drawn from the slot entrance at the front of the body portion 18 to the slot exit at the top of the body portion 18 lay within the angular range relative to the horizontal axis 20 just given.

Referring particularly now to FIGS. 3, 7, and 8, the attachment of second post 30 to body portion 18 will be described as will be its role in engaging a flexible tape. As seen in the Figures, body portion 18 includes a recess 46 that extends upwardly into body portion 18 from the bottom side 48 thereof. Second post 30 is pivotally attached to body portion 18 by a pin 50 that extends through the end 52 of second post 30. That is, second post end 52 includes a through hole 54 that receives pin 50 which functions as a shaft upon which second post 30 may pivot around.

Also disposed within recess 46 is a pawl 56. Pawl 56 includes a through hole 58 that receives a pin 60, which, like pin 50, functions as a shaft about which pawl 56 may pivot. Pawl 56 includes a tape engagement surface 62 that engages flexible tape 14 when pawl 56 is disposed in its tape engagement position as shown in FIG. 7. Pawl 56 traps, that is, clamps, tape 14 between its tape engagement surface 62, which has a radius to provide a better clamping surface against the flexible tape 14, and the top wall 44 of slot 36. Pawl 56 further includes a post engagement surface 64 that engages end 50 of second post 30. Thus, post engagement surface 64 contacts the forward surface 66 of second post end 50 such that as second post 30 is pivoted about pin 52 the pawl 56 is in turn pivoted into and out of a tape clamping position as seen in FIGS. 7 and 8.

Pawl 56 is configured and attached about its pivot axis (pin 60) such that its center of gravity, generally illustrated with reference numeral 68, is rearward of its pivot axis. When attached in this manner, pawl 56 will rotate counterclockwise from the engagement position shown in FIG. 7 to the non-engagement position shown in FIG. 8 when second post 30 is similarly pivoted counterclockwise, that is, with its outer end pivoted forwardly. In this position, pawl 56 may fall or pivot under the influence of gravity into a non-engagement position with the tape 14 as shown in FIG. 8. Pawl 56 functions to multiply the force applied to the flexible tape 14 to make pulling or tugging thereon a less strenuous task for the user of the tool 10.

Also shown in the Figures, and referring now particularly to FIGS. 2, 3, 4, and 6, is a cross bar 70 that serves as a grippable member for the user's other hand. Cross bar 70 extends substantially transversely to the body portion 18 at the rear thereof and in a plane substantially perpendicular to the plane defined by the first and second posts. Stated otherwise, the axes 32 and 34 define a plane which is substantially perpendicular to the elongate axis 72 of cross bar 70. Cross bar 70 may comprise a pair of individual arm members each having an end received within an appropriate socket in body portion 18 or it may comprise a single elongate member extending through a through hole in body portion 18.

As seen in FIG. 4, slot 36 extends within body portion 18 on the right side thereof as the tool 10 is viewed from a rearward to a forward direction. As noted earlier, tool 10 is shown being held with a user's left hand 12, which allows the user's thumb to guide the tape. If desired, the slot could be placed on the left hand side of body portion 18, thereby facilitating use of the tool with a user's right hand wherein the right thumb will guide the tape within the slot. A further advantage of the present invention is the ease with which the present tool can be switched to be useable by someone with shorter fingers. Thus, since a person's index finger is usually longer than a person's thumb, the present tool may find advantageous use in another person's right hand where that person's index finger is used to guide the tape within the slot. Thus, the present tool is equally useful in either hand and with both hands.

It should also be noted that the second post 30 is slightly offset from the axis of the body portion 18. This results from tile right side placement of the slot 36 within the body portion 18. If desired, the tool could include a centrally located slot that was fully enclosed and extended substantially centrally through the body portion 18. Posts 28 and 30 would then align with the body portion when the tool was viewed in an end to end manner as in FIGS. 4 and 5. Such a configuration could present manufacturing difficulty, thereby increasing the cost of such a configuration, however. For this reason the placement of the slot in one half of the body portion as shown in tile drawing figures is preferred.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. Apparatus for pulling on fish tape, said apparatus comprising:
   a body portion having a slot extending therethrough, said slot being a laterally accessible, open-faced channel sized to slidingly receive the fish tape therein;
   a first post attached to and extending outwardly from said body portion, said first post having a longitudinal axis;
   a second post attached to and extending outwardly from said body portion and spaced from said first post, said second post extending in substantially the same direction as said first post and cooperating with said first post so as to define a pistol grip hand engagement system, said second post being pivotally attached to said body portion;
   means for clamping the fish tape within said slot so as to grip the fish tape, said means being actuated by the pivotal movement of said second post.

2. Apparatus for pulling on fish tape, said apparatus comprising:
   a body portion having a slot extending therethrough, said slot being sized to slidingly receive the fish tape therein;
   a first post attached to and extending outwardly from said body portion, said first post having a longitudinal axis;
   a second post extending outwardly from said body portion and spaced from said first post, said second post extending in substantially the same direction as said first post and cooperating with said first post so as to define a pistol grip hand engagement system, said second post being pivotally attached to said body portion;
   means for clamping the fish tape within said slot so as to grip the fish tape, said means being actuated by the pivotal movement of said second post;
   said means including a pawl pivotally attached to said body portion, said pawl being pivotable between a first position and a second position by the pivotal movement of said second post, wherein in said first position said pawl is not in a clamping engagement with the fish tape and wherein in said second position said pawl is in a clamping engagement with the fish tape.

3. The apparatus of claim 2 wherein said second post has a longitudinal axis and is movable between a non-working post position and a working post position wherein said pawl clamps the fish tape, said second post axis being substantially parallel to said first post axis when said second post is in said working position.

4. The apparatus of claim 2 wherein said second post is pivotable toward said first post so as to actuate said means to clamp the fish tape securely in said slot such that a pulling force may be exerted thereon.

5. The apparatus of claim 1 wherein said second post is pivotable toward said first post so as to actuate said means to clamp the fish tape in place such that a pulling force may be exerted thereon.

6. The apparatus of claim 1 wherein said body portion has an elongate axis, said body portion axis being disposed substantially at a right angle to said first post axis.

7. The apparatus of claim 6 wherein said slot is defined by substantially planar walls.

8. The apparatus of claim 1 wherein said slot is disposed at substantially a ten degree angle relative to said body portion elongate axis.

9. Apparatus for pulling on fish tape, said apparatus comprising:
   a body portion having a slot extending therethrough, said slot being sized to slidingly receive the fish tape therein;
   a first post attached to and extending outwardly from said body portion, said first post having a longitudinal axis;
   a second post extending outwardly from said body portion and spaced from said first post, said second post extending in substantially the same direction as said first post and cooperating with said first post SO as to define a pistol grip hand engagement system, said second post being pivotally attached to said body portion;
   means for clamping the fish tape within said slot so as to grip the fish tape, said means being actuated by the pivotal movement of said second post;
   said body portion having a substantially cylindrical configuration including a forward end and a rear end, said slot extending from said forward end rearwardly.

10. The apparatus of claim 9 wherein said slot is defined by substantially planar walls.

11. The apparatus of claim 10 wherein said body portion has an elongate axis and said slot is disposed at substantially a ten degree angle relative to said body portion elongate axis.

12. The apparatus of claim 9 wherein said slot is defined by three walls, one of said walls engaging said other two walls and being substantially perpendicular thereto, and wherein said slot has an open side.

13. The apparatus of claim 9 wherein said body portion has a radius and said slot has a width substantially equal to the radius of said body portion.

14. The apparatus of claim 9 wherein said body portion further includes an outer cylindrical surface, said cylindrical surface being defined by an upper surface portion extending outwardly away frown said posts and wherein said slot has a forward end and a rearward end, said slot forward end beginning in said body portion forward end, said slot extending rearwardly and upwardly so as to terminate at said slot rearward end at said tipper surface portion.

15. The apparatus of claim 9 wherein said body portion includes a recess, said second post having an attachment end received within said recess and pivotally attached therein.

16. The apparatus of claim 15 wherein said pawl has an attachment end and said pawl attachment end is received within said recess forwardly of said second post attachment end.

17. The apparatus of claim 16 wherein said second post attachment end engages said pawl rearwardly of said pawl attachment end during pivotal movement of said second post.

18. The apparatus of claim 15 wherein said outer cylindrical surface includes a bottom surface portion and wherein said recess extends from said bottom surface portion upwardly into said body portion and intersects said slot.

19. The apparatus of claim 18 wherein said pawl extends upwardly into said slot from said recess, said slot is defined by at least three slot walls including an upper slot wall, and wherein said pawl includes a pawl clamping surface, said pawl clamping the fish tape between said pawl clamping surface and said upper slot wall.

20. The apparatus of claim 1 including a grippable member extending transversely at the rear of said body portion and having a grippable member elongate axis that extends substantially perpendicularly to the plane deemed by the axes of said first and second posts, said grippable member being provided for engagement by the operator's second hand.

* * * * *